(12) United States Patent
Chatterjee et al.

(10) Patent No.: US 8,930,653 B1
(45) Date of Patent: Jan. 6, 2015

(54) DATA DE-DUPLICATION FOR INFORMATION STORAGE SYSTEMS

(75) Inventors: Paresh Chatterjee, Fremont, CA (US); Udita Chatterjee, legal representative, Kolkatta (IN); Narayanan Balakrishnan, Milpitas, CA (US); Senthilkumar Ramasamy, Vriddhachalam (IN); Anandh Mahalingam, Newark, CA (US)

(73) Assignee: American Megatrends, Inc., Norcross, GA (US)

( * ) Notice: Subject to any disclaimer, the term of this patent is extended or adjusted under 35 U.S.C. 154(b) by 188 days.

(21) Appl. No.: 13/450,451

(22) Filed: Apr. 18, 2012

Related U.S. Application Data

(60) Provisional application No. 61/476,457, filed on Apr. 18, 2011.

(51) Int. Cl.
*G06F 12/00* (2006.01)
*G06F 13/00* (2006.01)
*G06F 13/28* (2006.01)
*G06F 11/14* (2006.01)

(52) U.S. Cl.
CPC ........ *G06F 11/1453* (2013.01); *G06F 11/1448* (2013.01)

USPC ............................ 711/162; 711/154; 711/159

(58) Field of Classification Search
CPC .................. G06F 11/1448; G06F 11/1453
USPC .................... 711/154, 159, 161–162
See application file for complete search history.

(56) References Cited

U.S. PATENT DOCUMENTS

| | | | |
|---|---|---|---|
| 6,745,194 B2 * | 6/2004 | Burrows | 1/1 |
| 8,135,683 B2 * | 3/2012 | Douglis et al. | 707/693 |
| 2011/0179341 A1 * | 7/2011 | Falls et al. | 714/807 |
| 2013/0006943 A1 * | 1/2013 | Chavda et al. | 707/652 |

* cited by examiner

*Primary Examiner* — Ryan Bertram
(74) *Attorney, Agent, or Firm* — Meunier Carlin & Curfman, LLC

(57) ABSTRACT

Technologies for eliminating duplicate data within a storage system. De-duplication may be performed done at physical chunk level, where the data is not copied or moved to different location. A logical mapping is modified using a thin de-duplication kernel module that resides between a distributed volume manager (DVM) and a logical disk (LD). De-duplication is achieved by changing pointers in the mapping to land at a physical location. De-duplication is performed as post-process feature where duplicates are indentified and the duplicates are marked in the mapping table, thereby claiming free space through de-duplication. Block-level de-duplication in accordance with the above can co-exist with existing storage architectures for thin provisioning and snapshot management.

20 Claims, 13 Drawing Sheets

DATA DE-DUPLICATION FOR INFORMATION STORAGE SYSTEMS

CROSS-REFERENCE TO RELATED APPLICATION

This application claims the benefit of U.S. provisional patent application No. 61/476,457, filed on Apr. 18, 2011, entitled "DATA DE-DUPLICATION FOR INFORMATION STORAGE SYSTEMS," which is expressly incorporated herein by reference in its entirety.

BACKGROUND

A growing amount of data generated in modern information systems presents considerable challenges with regard to storing, retaining, and managing information. These challenges have given rise to various data management technologies. For example, capacity planning, thin provisioning, and data reduction techniques are applied to improved efficiency in data storage systems. Data compression techniques have also been leveraged to address the magnitude of data stored by data storage systems.

Data de-duplication, also referred to as "de-dupe," is another approach for improving capacity and efficiency in data storage systems. De-duplication is a data reduction technology that can compact a storage footprint by eliminating multiplicities, or copies, in the stored data. Since storage servers are often required to host files and data from multiple clients and users, many files or data elements may reside as multiple copies within the storage system. The copies may be in various seemingly unrelated folders.

Even when each of these files is individually compressed, a great deal of efficiency may be obtained by eliminating the duplicated data elements. De-duplication at the file level can be implemented using hints obtained from file level meta-data to identify de-duplication candidate files. However, when dealing with unstructured data or with multiple versions of files that are different but share many blocks of common data, block level de-duplication may be more beneficial. Block level de-duplication may be far more difficult in environments where data is randomly accessed and altered after it has been de-duplicated.

In traditional storage systems having de-duplication, removal of duplicates is typically performed by writing the duplicate data to a different location. This involves reading of data from the old location and then writing it at new location. Other systems, provide inline de-duplication by implementing block-level finger printing. In such systems, each and every data pertaining to a volume is computed for a strong checksum and stored in a table. The checksums across various data chunks are compared with those in the table and the data chunks that have same checksums qualify to be duplicates. While this provides good de-duplication, this adds a burden to the incoming writes, as every write requires that a checksum computed because the underlying data changes. This adds burden to the frontline IO, since the checksums are computed as the write occurs, leading to a performance penalty. These solutions require a large amount of storage space—as high as 10% of the total storage in order to perform de-duplication. So, unless there is a good chance the incoming data will have duplicates, the de-duplication logic itself would take about 10% of physical space thereby discouraging de-duplication. This additional space usage also involves writing/mirroring data, which will have its own impact on the inline I/O performance. Further, these systems require additional processing power to computer the checksums, and as the storage size grows, will require more time to perform look-ups and generate checksums.

In some systems data is de-duplicated such that there is only a single instance of a particular data item. References to the data item each point to the single instance. However, if there is a problem with the physical media on which the data item is stored, the system will generate read errors each time it attempts to access the data.

It is with respect to these considerations and others that the disclosure made herein is presented.

SUMMARY

Technologies for eliminating duplicate data within a storage system. De-duplication may be performed done at physical chunk level, where the data is not copied or moved to different location. A logical mapping is modified using a thin de-duplication kernel module that resides between a distributed volume manager (DVM) and a logical disk (LD). De-duplication is achieved by changing pointers in the mapping to land at a physical location. De-duplication is performed as post-process feature where duplicates are indentified and the duplicates are marked in the mapping table, thereby claiming free space through de-duplication. Block-level de-duplication in accordance with the above can co-exist with existing storage architectures for thin provisioning and snapshot management.

In accordance with some implementations, there is provided a method for removing duplicate data within a data storage system, comprising: identifying duplicated data within the data storage system; initializing a de-duplication table; creating at least one circular list of indices in the de-duplication table, wherein each of the indices points to a physical location having a same data; receiving I/O requests; and mapping the I/O requests to the physical location using the de-duplication table.

In accordance with some implementations, there is provide a data storage system that includes a storage server, a physical storage device associated with the storage server, a processing unit associated with the storage server and one or more modules for execution on the processing unit. The processing modules are operable to identify duplicated data within the data storage system, initialize a de-duplication table, create at least one circular list of indices in the de-duplication table, wherein each of the indices points to a physical location having a same data, receiving I/O requests, and map the I/O requests to the physical location using the de-duplication table.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
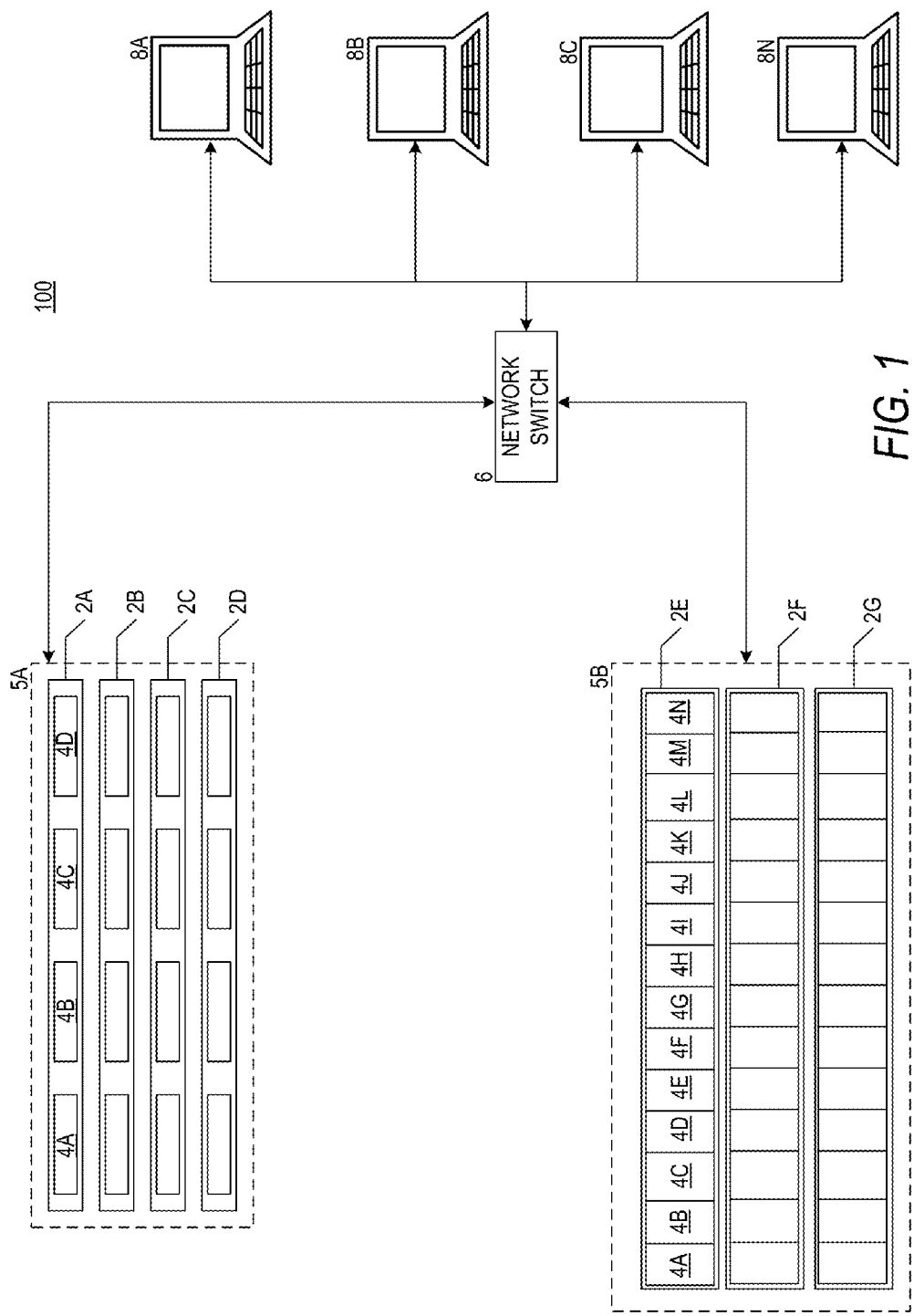
FIG. 1 is a network architecture diagram illustrating aspects of a storage system according to an embodiment presented herein.

The following detailed description is directed to technologies for eliminating duplicated date within a data storage system. Through the use of the embodiments presented herein, technologies for identifying and eliminating duplicated date within a data storage system can increase storage efficiency while maintaining data protection.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for eliminating duplicated data within a data storage system will be described.

Turning now to FIG. 1, details will be provided regarding an illustrative operating environment for the implementations presented herein, as well as aspects of several software components that provide the functionality described herein for data de-duplication within a data storage server. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B (collectively, clusters 5) include storage server computers 2A-2G (also referred to herein as "storage nodes" or a "node", collectively nodes 2) that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D (collectively, disks 4). Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to handle I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage, but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to the various implementations, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network (LAN) as the clusters 5A-5B or may be connected to the clusters 5A-5B via a distributed wide area network, such as the Internet. An appropriate protocol, such as the Internet Small Computer Systems Interface (iSCSI) protocol may be utilized to enable the initiators 8A-8D to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one, or more, of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Data de-duplication features may be provided on one or more storage server computers 2A-2G, one or more storage clusters 5A-5B, or one or more client computers 8A-8N. Furthermore, the processes for implementing de-duplication may execute on any of these systems or may operate in a distributed fashion with components executing across two or more of these systems.

Figure 2:
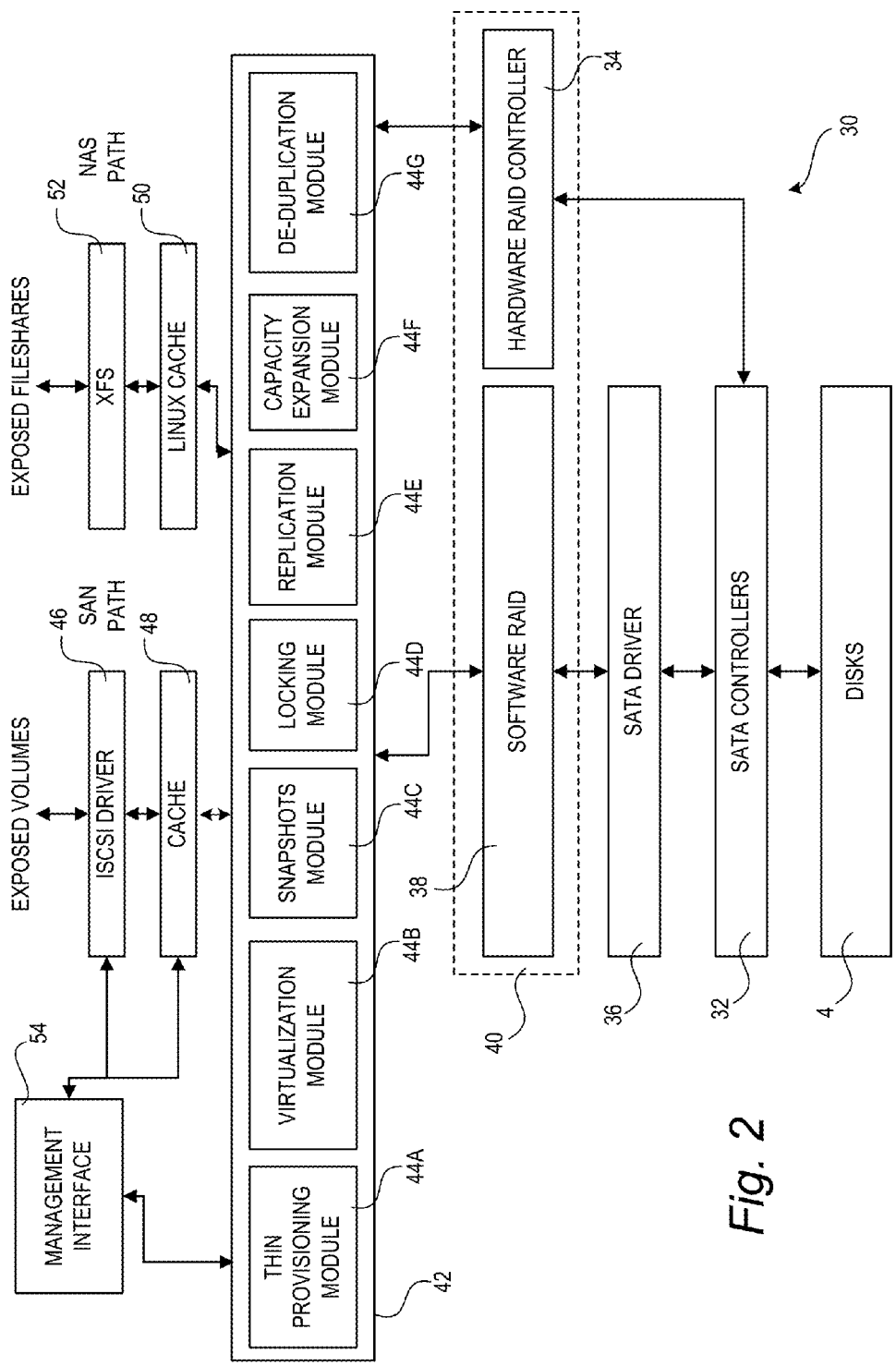
FIG. 2 an illustrative computer software architecture for practicing the various implementations of the present disclosure will now be described.

Turning now to FIG. 2, an illustrative computer software architecture for practicing the various implementations of the present disclosure will now be described. In particular, FIG. 2 illustrates a storage stack 30. At the top of the storage stack 30, storage volumes or fileshares are exposed to the initiators 8A-8D. At the bottom of the storage stack 30 are the actual mass storage devices, such as the disks 4, which are utilized to store the data. The mass storage devices are, in turn, connected to a disk controller, such as a Serial ATA ("SATA") controller 32 or a hardware RAID controller 34. In the case of a SATA controller, a SATA driver 36 may be utilized to access the hardware device. Additionally, a software RAID module 38 may also be utilized to provide RAID services in the absence of a hardware RAID controller 34. A unified RAID management layer 40 may be utilized to simplify the utilization of RAID with either software or hardware implementations.

Above the unified RAID management layer 40 sits a device driver 42 that implements the functions described herein. In particular, the device driver 42 may provide functionality for implementing thin provisioning, virtualization, snapshots, locking, replication, capacity expansion and de-duplication. These features are implemented by the modules 44A-44G, respectively. Above the device driver 42, a number of software components are utilized depending upon the access mechanism utilized to access the data stored on the hard disk drives 4. In particular, a Storage Area Network ("SAN") path is provided that utilizes a cache 48 and a Internet Small Computer Systems Interface ("iSCSI") driver 46. A Network Attached Storage ("NAS") path is also provided that utilizes a LINUX cache 50 and the XFS high-performance journaling file system 52. Volumes are exposed through the SAN path while fileshares are exposed through the NAS path.

It should be appreciated that the device drive 42 comprises a LINUX-compatible mass storage device driver in the implementations of the present disclosure. However, although the various implementations of the present disclosure are described as being implemented within a LINUX-compatible device driver, the various aspects may be implemented at different points within the storage stack and in conjunction with other operating systems. For instance, the aspects of the disclosure may be implemented with the FREEBSD operating system or with the WINDOWS family of operating systems from MICROSOFT CORPORATION of Redmond, Wash.

According to embodiments of the disclosure, a management interface 54 may also be provided for controlling and monitoring the various aspects of the present disclosure. The management interface communicates with the various layers through software interfaces to retrieve performance data, provide configuration data, and to perform other functions.

Figure 3:
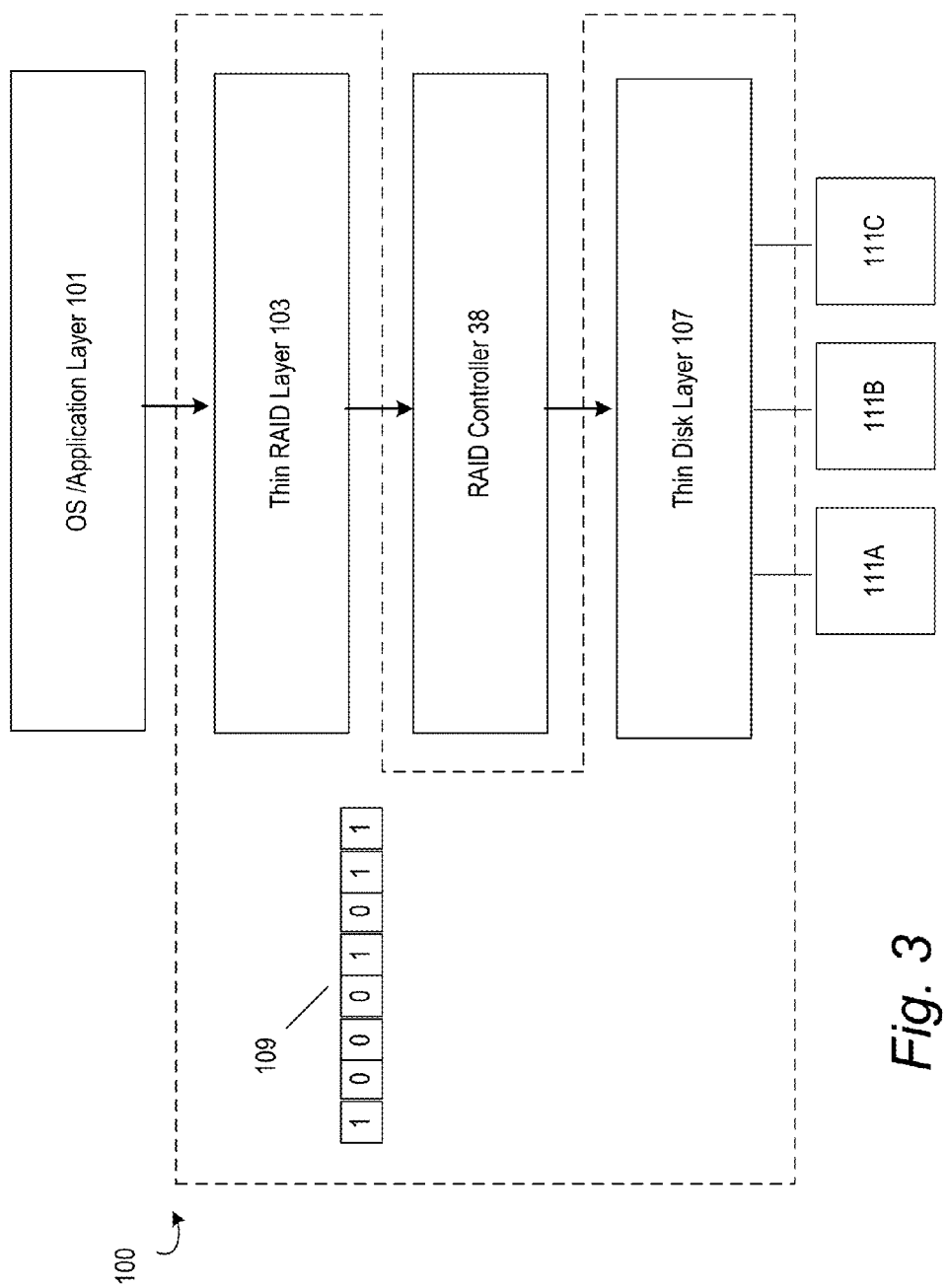
FIG. 3 illustrates details of modules that may participate in a storage stack of FIG. 2.

FIG. 3 illustrates details of modules 100 that may participate in the storage stack 30 of FIG. 2. As shown, the module 100 may include a thin RAID layer 103, a thin disk layer 107 and a bitmap 109. The module 100 may be a software module and may be designed to operate with the software RAID controller 38 of FIG. 2. For example, the module 100 may be a plug-in to the RAID controller 38.

In particular, the module 100 may act as multiple intermediate layers between an operating system/application layer 101, the RAID controller 38, and a plurality of volumes 111A, 111B and 111C. The volumes 111A-111C may form a RAID array that is managed by the RAID controller 38. The RAID array may be a variety of RAID types including, but not limited to, RAID-0, 1, 2, 3, 4, 5, 6 etc. Moreover, more or fewer volumes 111A-111C may be supported. In some implementations, the volumes may each comprise a physical hard disk drive. Other types of volumes may be used such as network volumes, virtual volumes, and logical volumes.

The bitmap 109 may include an entry for each stripe from the logical array (i.e., volumes 111A-111C). In some implementations, one bitmap 109 may cover the entire array, in other implementations; each volume 111A-111C may have its own associated bitmap 109. The bitmap 109 may be stored as part of the module 100 and/or may be stored across the volumes 111A-111C. Other data structures may also be used. In some implementations, the bitmap 109 may not have entries for stripes associated with parity data or parity volumes, for example.

Each entry in the bitmap 109 may indicate whether the stripe associated with the entry has valid data or alternatively, "zero" data. Valid data in a stripe may be indicated by a "1" in the entry associated with a stripe while zero data may be indicated by a "0" in the entry associated with the stripe. Data in a stripe is considered zero data if no data has been written to the stripe for a current build of the array, or if the data in the stripe has been otherwise deleted. Thus, when an array or volume is created, all entries in the bitmap 109 associated with the array may be set to "0" by the module 100. When a stripe is subsequently written to, the module 100 may set the entry associated with the stripe in the bitmap 109 to "1". When the data in a stripe is deleted, the module 100 may set the entry associated with stripe in the bitmap 109 to "0". In some implementations, when a change is made to an entry in the bitmap 109, the module 100 also persists the changes in a metadata area associated with the array. For example, the changes may be logged or journaled.

The thin disk layer 107 may intercept I/Os made by the RAID controller 38 to the volumes 111A-111C. Where the I/Os are read I/Os, the thin disk layer 107 may first determine which stripe that the chuck or chunks associated with the read I/O are part of, and may find the corresponding entry for the stripe in the bitmap 109. If the entry associated with the stripe in the bitmap 109 is a "0", then the data in the stripe is zero data and the thin disk layer 107 may return the zero data to the RAID controller 38 without providing the I/O to the volumes 111A-111C. If the entry associated with the stripe in the bitmap 109 is a "1", then the data in the stripe has been written to and the thin disk layer 107 may provide the I/O to the volumes 111A-111C for processing as normal. As may be appreciated, by only fulfilling read I/Os from the volumes 111A-111C for data that is known to be valid and non-zero, the overall responsiveness and performance of the array may be improved by the module 100.

Where the intercepted I/Os are write I/Os, the thin disk layer 107 may first determine which stripe that the chuck or chunks associated with the write I/O are part of, and may find the corresponding entry for the stripe in the bitmap 109. If the entry associated with the stripe in the bitmap 109 is a "1", then the data in the stripe is non-zero data and the I/O is passed to the volumes 111A-111C as normal. If the entry associated with the stripe in the bitmap 109 is a "0", then the data in the stripe is zero data and this is the first time that the stripe will be written to. Accordingly, the thin disk layer 107 may change the entry associated with the stripe in the bitmap 109 to a "1", and may pass the write I/O to the volumes 111A-111c as normal. In addition, in some implementations, the thin disk layer 107 may modify the write I/O to write zeros or other data to the portions or chunks of the stripe that are not written to by the write I/O. Thus, initially a full stripe of data is written to every strip in the array even if the write I/O is only a partial write.

The thin RAID layer 103 may intercept I/O from the operation system/application layer 101. For a write I/O, the thin RAID layer 103 may pass the I/O to the RAID controller 38 for processing. For a read I/O, the thin RAID layer 103 may first determine which stripe that the chuck or chunks associated with the read I/Os are part of, and may find the corresponding entry for the stripe in the bitmap 109. If the entry is a "1" then the data stored in the stripe is non-zero and the thin layer 103 may pass the read I/O to the RAID stack 105 for processing as normal. If the entry is a "0", then the data stored in the stripe is zero data, and the thin RAID layer 103 may not provide the read I/O to the RAID controller 38. Instead, the thin RAID layer 103 may return the zero data to the operating system layer 101, or may generate some error to the operating system/application layer 101 that the read I/O is not valid or otherwise cannot be processed. The thin RAID layer 103, RAID controller 38 and thin disk layer 107 together provide for bad block detection and correction.

As can be appreciated, the bitmap 109 of the module 100 may be able to increase the performance of many RAID related operations besides read I/Os described above. With respect to the initialization operation described previously, the speed of initialization operation may be greatly increased by only writing stripes and parity data for stripes that have a "1" entry associated with them in the bitmap 109. Accordingly, where an array is new (i.e., all entries in the bitmap are "0"); the initialization process may be almost instantaneous.

Figure 4:
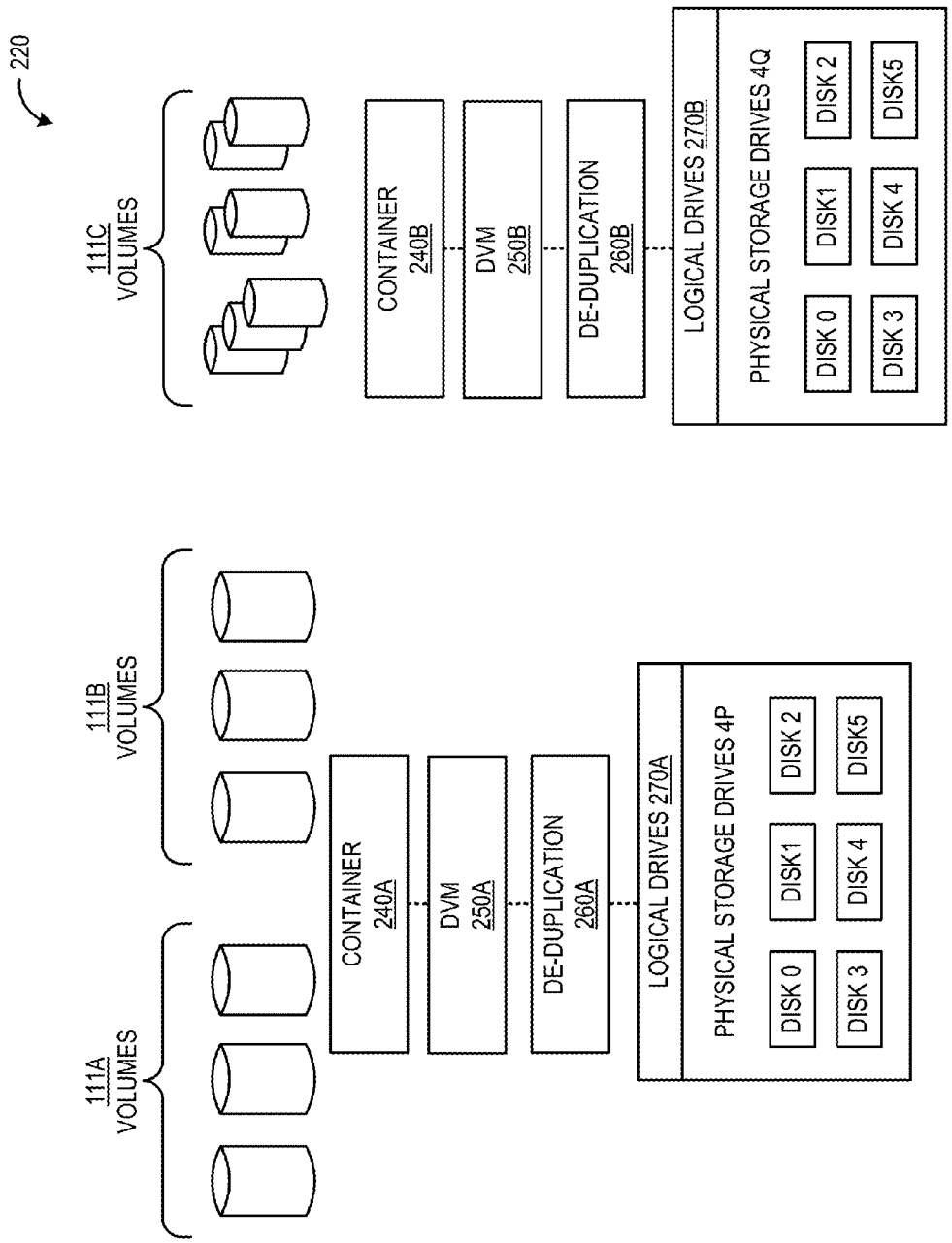
FIG. 4 illustrates a block diagram of a data de-duplication module operating in conjunction with distributed volume management (DVM) architecture in a data storage system.

Referring now to FIG. 4, there is illustrated a block diagram illustrating a data de-duplication module operating in conjunction with distributed volume management (DVM) architecture in a data storage system. An architecture 220 can support both data de-duplication and enterprise-class snapshot features. Volume 111A and 111B and similarly snapshots within a container 240A may be supported by a DVM module 250A and a de-duplication module 260A. A snapshot layer may be visible to the DVM class but transparent to the de-dupe class. Both the DVM class and the de-dupe class may be supported by logical drives 270A abstracted from physical storage drives 4P. Volumes 111C, and similarly snapshots, within a container 240C may be supported by a DVM module 250B and a de-duplication module 260B. A snapshot layer may be visible to the DVM class but transparent to the de-dupe class. Enterprise class snapshot features along with the data de-duplication technology presented herein can be supported within the cascaded architecture 220. Both the DVM class and the de-dupe class may be supported by logical drives 270B abstracted from physical storage drives 4Q. The de-duplication modules 260A and 260B may be provided as a plug-in within the storage stack 30. The plug-in can be enabled or disabled for any container 240A or 240B.

Figure 5:
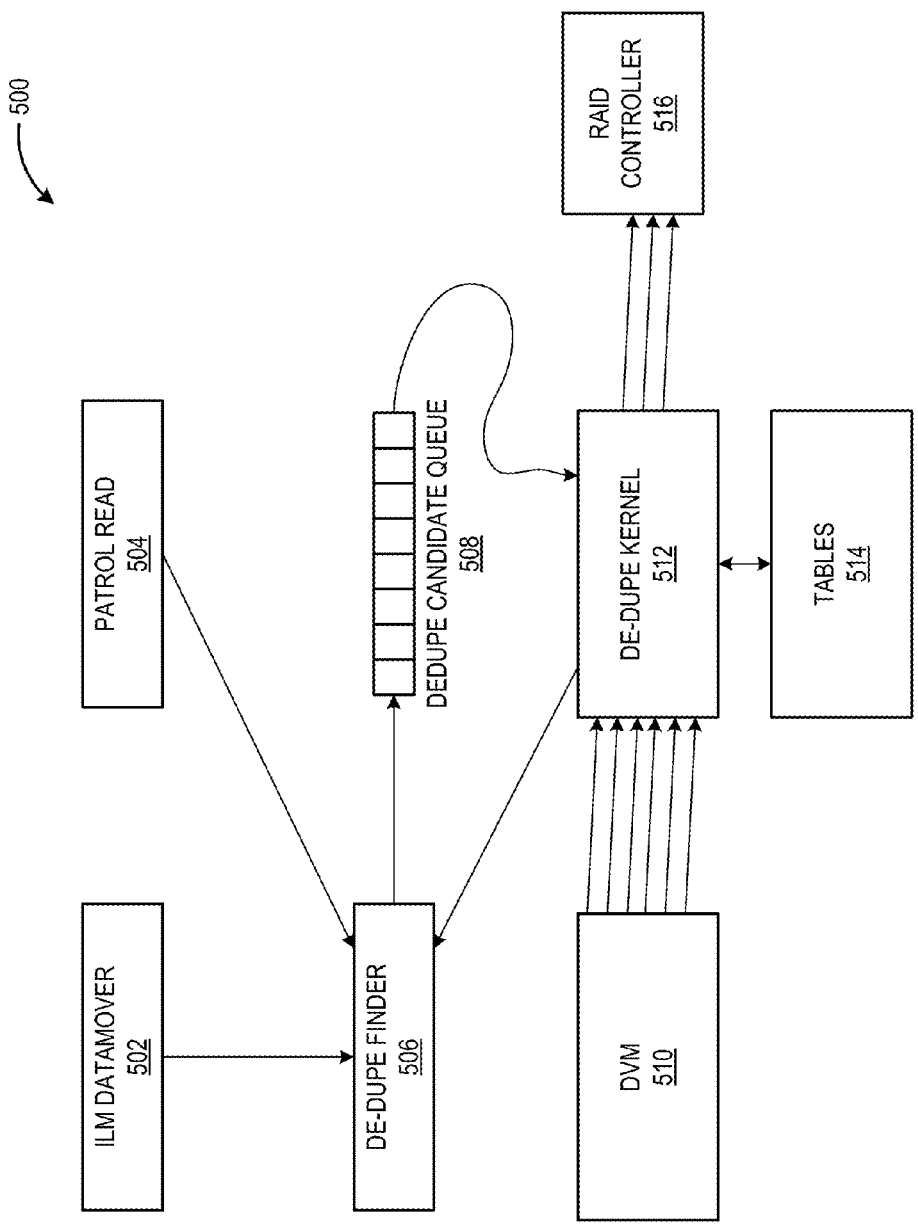
FIG. 5 is an example block diagram of de-duplication system according to an example implementation of the present disclosure.

FIG. 5 is an example block diagram of de-duplication system 500 according to an example implementation of the present disclosure. For example, the de-duplication system 500 may include an ILM datamover 502, a patrol read 504, a de-dupe finder 506, a de-duplication queue 508, a distributed volume manager (DVM) 510, the de-dupe kernel module 512, the RAID management layer 40, and one or more tables 514. The de-dupe kernel module 512 is a layer under the DVM 510 and above a RAID controller 516. The de-dupe kernel module 512 performs de-duplication using one or more mapping tables 514, which are described in detail below. Data de-duplication creates kernel-level metadata (e.g., tables 514) that is associated with de-duplication operations, including the de-duplication map table and the de-duplication bitmap, which are discussed in detail with reference to FIGS. 6-{x}. It is noted that in accordance with some implementations, the de-dupe kernel module 512 may correspond to the de-duplication module 44G, the DVM 510 may correspond to the DVM 250A or 250B, and the RAID controller 516 may correspond to the software RAID controller 38 or the hardware RAID controller 34, in FIG. 2.

In accordance with aspects of the present disclosure, a user may specify the logical disks that are to be included in the scope of de-duplication. For example, through a management interface, the user may add various logical disks (e.g., logical drives 270A and/or 270B) to de-duplication classes. In addition, the user may remove various logical disks from de-duplication classes, though this operation may only be done with certain limitations. A de-duplication class is uniquely associated with a container (240A and/or 240B), i.e., with a controller that is part of the data storage system. In a single-controller system, there is a single de-duplication class.

However, for example, in an Storage Bridge Bay (SBB) system, there are two de-duplication classes. Various tools, such as the de-dupe finder 506, may run as a single instance per de-duplication class. Details of the de-dupe finder 506 may be found in U.S. patent application Ser. No. 13/450,407, filed on Apr. 18, 2012, entitled "Data Duplication for Information Storage Systems," which is incorporated herein by reference in is entirety. De-duplication falls under the scope of SBB. Thus, if an SBB device has two canisters and one controller fails, the second controller takes over the control of I/O operations to the failed controller, which necessitates the exchange of some de-duplication data, such as the de-duplication bitmaps and the de-duplication map table. However, the operation of further de-duplication on the canister corresponding to the failed controller will not be performed until the controller comes back online. Each de-duplication class exposes a virtual logical disk, i.e., a logical representation of the space that is made available after de-duplication.

The management interface may also be used to control timing of de-duplication processing. For example, a de-duplication schedule may set a specific timing (i.e., weekly, daily, based on workflow, etc.) for identifying candidates for de-duplication and for processing the candidates (i.e., by enabling the de-duplication queue 510). Alternatively, a user may force de-duplication by command. Additionally, through the management interface, it may be possible to conduct a de-duplication dry run. A dry run may identify candidates for de-duplication and queue the candidates in a list maintained by the de-duplication queue 510 but not enable de-duplication of the candidates. The management interface may also facilitate collection of de-duplication statistics.

De-duplication may be performed either in-line (or concurrently with I/O operations) or as part of a post-processing operation (or subsequently to I/O operations). The de-duplication processes are the same whether performed in-line or post-processing. When de-duplication is performed in-line, the overhead to perform the I/O operations increases and the speed at which the I/O operations may be performed decreases. In particular, the written data block must be compared to the existing data blocks to determine if a candidate for de-duplication exists concurrently with the I/O operation. In addition, when de-duplication is performed in-line, there is a risk of invalidating de-duplicated blocks of data. For example, if data is written to a block of data that has been previously de-duplicated, the de-duplicated blocks of data will no longer identical. Accordingly, the blocks of data must be duplicated concurrently with the I/O operation. However, when de-duplication is performed post-processing, de-duplication may be periodically performed and may also be configured based on system workflow to reduce the impact on system performance.

Block level de-duplication may be beneficial when de-duplicating unstructured data or multiple versions of files that share blocks of common data. In an example implementation discussed herein, a 32 TB portion of storage space may undergo block level de-duplication. During block level de-duplication, the 32 TB portion of storage space may be de-duplicated in 64 kB chunks. It is noted that 64 kB is the block level used by many file systems, e.g. NTFS, which makes it a good size for a de-duplication granularity. Further, 64 kB matches with the size used by the DVM 510 for mapping. However, it should be appreciated that the size of the portion of storage space and the size of the chunks may be greater than or less than 32 TB and 64 kB, respectively. Accordingly, in the example implementation, the sizes of the portion of storage space and the chunks are provided only as an illustration.

It may be desirable to insure that de-duplication does not pose an unmanageable overhead to I/O operation performance because of background reads during post-processing de-duplication. For example, when de-duplicating the 32 TB portion of the storage space in 64 kB chunks, 5.12 million chunks (i.e., 32 TB divided by 64 kB) must be de-duplicated. Assuming the de-duplication reads are constrained to approximately 32 MB/s, a full pass of the 32 TB portion of the storage space will take about 12 days. If the size of the portion of storage space to be de-duplicated is smaller, the full pass cycle time will also be significantly lower. Thus, de-duplication may be performed infrequently in accordance with a predetermined schedule. For example, de-duplication operations may be performed once a week. In addition, the workflow module may be used to ensure that de-duplication occurs only when the system is not in use or during period of lower use. De-duplication may also be forced, i.e., de-duplication may be performed in response to an explicit user command. In this case, the de-duplication is triggered immediately.

To manage the impact of de-duplication, information lifecycle management (ILM) and workflow management modules may enforce de-duplication policies to support robust, scalable, and efficient operation. The policies may provide indicators as to which regions and/or tiers may be candidates for de-duplication and what times may be preferred for scheduling de-duplication operations to reduce undesirable impact on system performance. For example, de-duplication policies may be based on ILM statistics regarding frequency and time of last access. The ILM can set de-duplication for only certain tiers, e.g., the lower tiers. By doing so, more data may be brought down from higher tiers to lower tiers as the data ages. Because data in the lower tiers is not modified often, they are good candidates for de-duplication. Therefore, it may be desirable to perform de-duplication on more stable chunks, i.e., chunks that are infrequently accessed and/or have longer recorded times of last access, as this will reduce the overhead associated with de-duplication Alternatively, a chunk may be identified based on information received from the patrol read 504. The patrol read 504 is a periodic consistency check performed on RAID arrays.

Alternatively or additionally, the de-dupe kernel module 512 may use a context-based API, for example, to determine the last "logical chunk" (i.e., the logical disk and chunk combination) that was read by the de-duplication system and may return the next chunk (or chunks) to read. To perform this operation, the de-dupe kernel module 512 may consult the volume tables (to identify written chunks), the timestamps (to ignore very old chunks) and the de-duplication re-write bitmap (to ignore chunks that have already been updated in the de-duplication tracker 904). For example, the de-dupe kernel module 512 may consult the First Write Bitmap (FWB) that indicates written chunks and/or the re-write bitmap that is updated after a de-duplication data structure is updated.

The de-duplication queue 510 may be responsible for maintaining a list of candidate chunks for de-duplication. In particular, the de-duplication queue 510 may maintain a list of chunks identified for de-duplication based on matching signatures, for example. The de-duplication queue 510 may coordinate with the de-dupe kernel module 512 to perform de-duplication. For example, the de-duplication schedule may periodically set a time (i.e., weekly, daily, based on workflow, etc.) for processing the list of candidate chunks maintained by the de-duplication queue 512. Alternatively, processing of the list of candidate chunks maintained by the de-duplication queue 512 by specific command may be forced by command using, for example, the de-duplication management interface discussed above.

In accordance with aspects of the present disclosure, de-duplication can be performed at either a logical level or a physical level. The logical level is the amount of storage that is advertised irrespective of the physical storage on the system. For example, the user may be able to create a 256 TB volume even though there is only 12 TB of physical space. The volume will appear to be a 256 TB volume and the user will be notified when the physical volume space. The physical level is the amount of storage under the stack. As will be described below, using the physical storage level may provide for smaller tables 514, as the logical level advertises a much larger amount of storage that is physically available.

The DVM 510 has a provision tracking mechanism and that has knowledge of which data has been utilized, which data has been modified and data that has not been used at all. The helps to reduce the table size to data that has actually been used and is meaningful. Thus, in accordance with aspects of the present disclosure, de-duplication is performed at the physical level to reduce the table size and take advantage of the knowledge of the DVM 510. In addition, de-duplication may be performed across multiple volumes 111A-111C. As identifying duplicate regions can be computationally time consuming, the process may be performed in the background.

The DVM 510 maintains a timestamp at a territory level for each territory in the system 100. This timestamp denotes a time at which a write was last performed to the particular territory. However, the write could be a write to a single chunk (64 kB) or a write to whole territory write (8 MB). In some implementations, the timestamp is used to identify whether the territory has modified after the last run of the de-dupe finder 506, as the de-dupe finder 506 periodically makes a request for chunks to de-dupe. When run, the de-dupe finder 506 returns only those chunks that have been modified, since non-modified would have already been de-duped.

The timestamp may have a value of zero at a start of the day. When a write occurs, the timestamp is updated to current time and I/O is allowed. Thus, the DVM timestamp captures a time when change occurred.

The DVM 510 also provides a mechanism to identify, at a snapshot chunk granularity, the writes on a particular logical location within a volume. This delta-chunk mechanism coupled with the snapshot time may be used to identify whether the given block has been modified after the last run of de-dupe finder 506. A Snapshot Volume Table (SVT) table tracks differences since a last snapshot at a 64 kB level. Within the SVT, a provision allocation bitmap marks differences at a finer granularity (e.g., 8 kB). The SVT performs an accounting on a per-provision level. Thurs, if there is a need for a read-modify-write that was already performed in the snapshot, then it is not performed again. This helps to minimize the performed degradation caused by de-duplication. Further, in the event of a power failure, there may be a snapshot taken every day. Any new writes after the snapshot will have new provision chunk allocated. The SVT will have a bit set to identify the delta chunk. For example, if a snapshot is taken at 10:00 AM and it is now 12:00 PM, then the logic only need to look for modifications performed in the past two hours. Thus, using snapshot logic, the DMV 510 enables the system to narrow down what de-duplication operations need to be performed.

A bit at a de-dupe chunk level may be maintained to determine whether the physical block has been modified after the last run of the de-dupe finder 506. This use of this bit may be transparent to the existing stack, since there is no modification needed in the DVM 510 to support the logic. For example, this may be maintained as a bitmap at the de-dupe kernel module 512 with a small memory footprint. The bitmap could also be reconstructed using the other mechanisms across reboot to avoiding logging the bit changes in the disk. Alternately, this bit can be encoded within the data of de-dupe index table (see, e.g., FIG. 6) thereby minimizing any changes. A combination of the above three could also be used to identify chunks for de-dupe. Write bitmap could handle runtime and/or initial scan, while DVM timestamp and delta-chunks could help across reboots/power failure situation.

Figure 6:
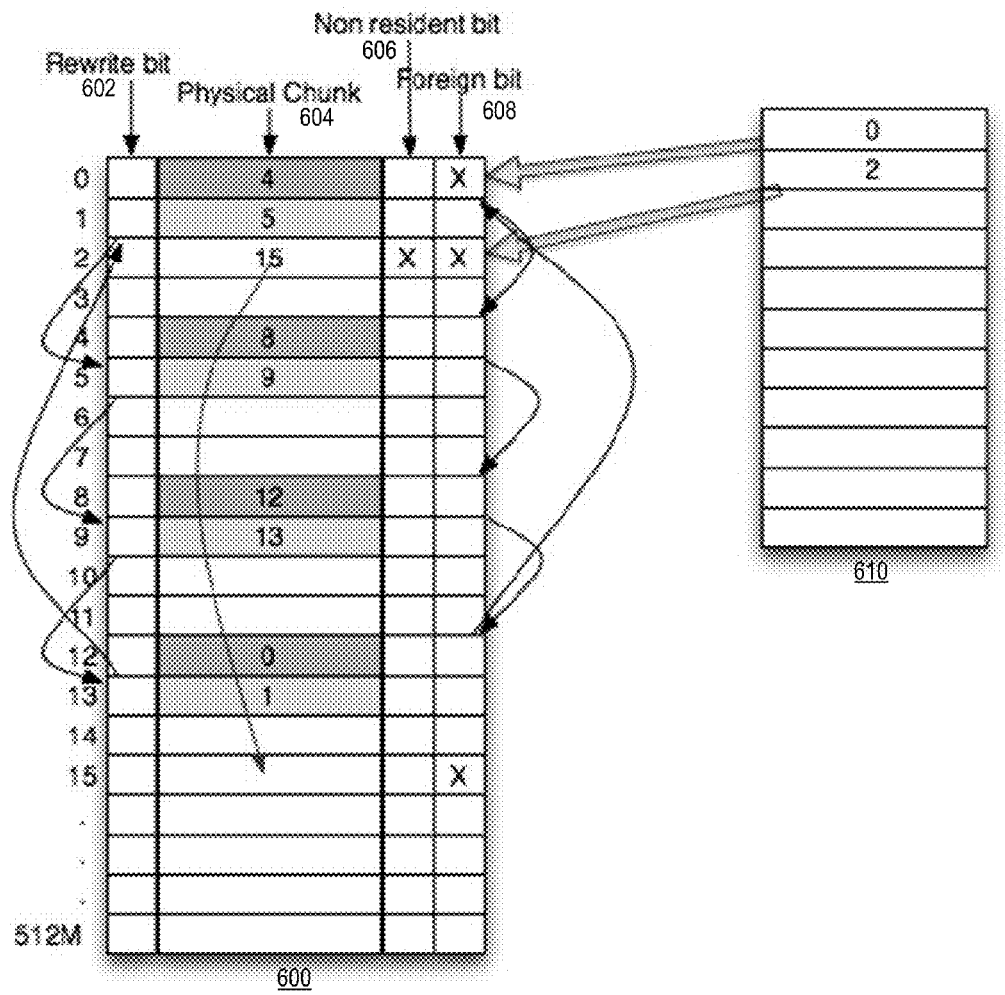
FIG. 6, there is illustrated a de-dupe index table and a phantom logical disk (LD) table in accordance with the present disclosure.

With reference to FIG. 6, there is illustrated a de-dupe index table 600 and a phantom logical disk (LD) table 610 in accordance with the present disclosure. The de-dupe kernel module 512 maintains the de-dupe index table 600, which is used to maps each physical chunk of a de-dupe size (64 KB) in the logical drives. For a 32 TB storage stack of de-dupeable space, in the de-dupe index table 600, 29 bits are needed to address each physical chunk when de-duplication is performed at the chunk level (64 kB). This requires 512M entries, each having a size of 4 bytes (32-bits). Thus, the de-dupe index table 600 occupies 2 GB of memory for each 32 TB of de-dupeable space. Each entry consists of the following 32-bit structure: a rewrite bit 602, a 29-bit physical bit structure 604 to address physical chunks, a non-resident bit 606 and a foreign bit 608.

As noted above, 29-bits are need to address each physical chunk in the storage stack. The rewrite bit 602 is used to indicate whether its associated chunk was written to after the start of the last de-dupe finder iteration. Initially the rewrite bit 602 is zero, however write the data is changed, then the rewrite bit 602 is changed. In a later de-dupe cycle, a marked zone should be de-duped. The rewrite bit 602 may be logged such that if there is a power failure, when system comes back up, the system 100 will be able to indentify that a zone needs to be de-duped. The DVM 510 may provide an architecture for logging. You can use this rewrite bit to de-dupe only on the chunks that have been changed. The rewrite bit is optional if a chunk number, such as −1, is used to indicate that a particular index location has been rewritten, The foreign bit 608 is used to indicate that some other chunk is using this chunk's physical space. The non-resident bit 606 is used to indicate that associated chunk is not stored one-to-one and is being hosted in some other chunk's place. The use of the status bits 602, 606 and 608 are described below.

The phantom LD table 610 is used to maximize the capacity of the system 100 by taking space from chunks that have duplicate data and from chunks that have never been written. The phantom LD table 610 presents an image of a single, contiguous LD to the DVM 510, while hiding the details of sparse free chunks spread across the system 100, thereby providing DVM 510 with a simpler interface to work with. Details of the phantom LD table 610 will be described with reference to FIG. 7.

Whenever duplicates are found by the de-dupe finder 506, the duplicate chunks are linked together in the de-dupe index table 600 as a circular list or a chain. For example, as shown in FIG. 6, an index 0 has a physical chunk number of 4; index 1 has a physical chunk number of 5, etc. When duplicates are identified, each duplicate itself becomes a circular list within the de-dupe index table 600 wherein, the physical chunk holds the index to the next duplicate in the circular list. An entry can be easily differentiated between whether it is physical chunk number or circular list index by looking at the value. For example, in FIG. 6, the data associated with index 1, 5, 9, and 13 may be identified as duplicates. Likewise the data associated with index 0, 4, 8, and 12 may be identified as duplicates. As shown, a circular list is created where the physical chunk associated with index 1 is 5; index 5 is 9; index 9 is 13; and index 13 is 0. Another circular list is created where the physical chunk associated with index 0 is 4; index 4 is 8; index 8 is 12; and index 10 is 0.

To accommodate situations when a write I/O comes in that is directed to writing to one of the locations in the circular list, then the following may be performed. For example, if entry 13 is modified, the write goes to zone 12. Next, the circular list in the de-dupe index table 600 is updated to remove 13 from the list. As such, index location 9 will be changed to point to index location 1.

Using the de-dupe index table 600, the physical chunk number 604 is an index. Whenever a read I/O is processed, the data for each zone can be satisfied from any of the locations. Further, when the duplicates are identified, the data is not removed, rather the table is updated and the data is allowed to remain. This enables all chunks to function as golden copies. The data in these blocks, even though identified as duplicates, will not be released until a space crunch occurs and the phantom LD table 610 becomes active. Thus, each of the chunks in the circular list will have a copy of the same data. Whenever a new write comes to one of the elements in the de-dupe circular list, it is pulled out of the circular list and the data is written to its own chunk.

In some implementations, the system 100 may be configured to leave two golden copies because there may be medium errors. Therefore, this acts as a mirror of the data. Thus, at least two copies in the circular list will have the original data. However, the system may not simply leave two copies, because it is possible that a write may come into any of the indices in the circular list, including those that were reserved as golden copies. This may result in a situation where there are less than two golden copies remaining of the data. Thus, in accordance with implementations of the present disclosure, the length of the circular list may be used to determine the number golden copies that are retained in the system 100. As the chain list grows, more golden copies are retained to reduce the chance that subsequent writes will destroy the golden copies. In particular, the system 100 may be configured to keep at least 10% of the indices in the circular list as duplicates.

The above may be used to overcome, e.g., medium errors on the disks 4A-4N. For example, with reference to FIG. 6, if an I/O comes in for index location 1, the de-dupe index table 600 will point to physical location 5, which may be read from the physical disk. However, if during the read at physical location 5, there is a medium error, the thin RAID layer 103 may handle this by keeping a bad block table. Using the circular logic, the logic may move physical location 13, because it is know that 13 is a duplicate of 5. Thus, the logic can correct medium errors it by allocating data into a new zone on a disk to satisfy subsequent reads.

As noted above the de-dupe index table 600 has 512M entries of 4 bytes each. As such, the de-dupe index table 600 may be too large to be a single table in memory. Rather, in some implementations, the de-dupe index table 600 may be a group of tables that each are the size of a memory page (e.g., 4 k or 8 k). Thus, a page is allocated in memory, into which the tables are placed. As such, a first page would include table entries from 0 to 2 k; the second page would be 2 k+1 to 4 k, and so on. When duplicates occur within a particular zone, memory can be allocated for it on the fly. If there are no duplicates within a zone, the memory does not have to be allocated, thus saving space.

In accordance with some implementations, the de-dupe index table 600 is not persisted to disk every time it is modified. Rather log entries may be created when there are modifications to the de-dupe index table 600. The log may be replayed to update the circular list after reboot or power failure. In some implementations, the logging architecture may be part of a DVM 510 logging mechanism.

Figure 7:
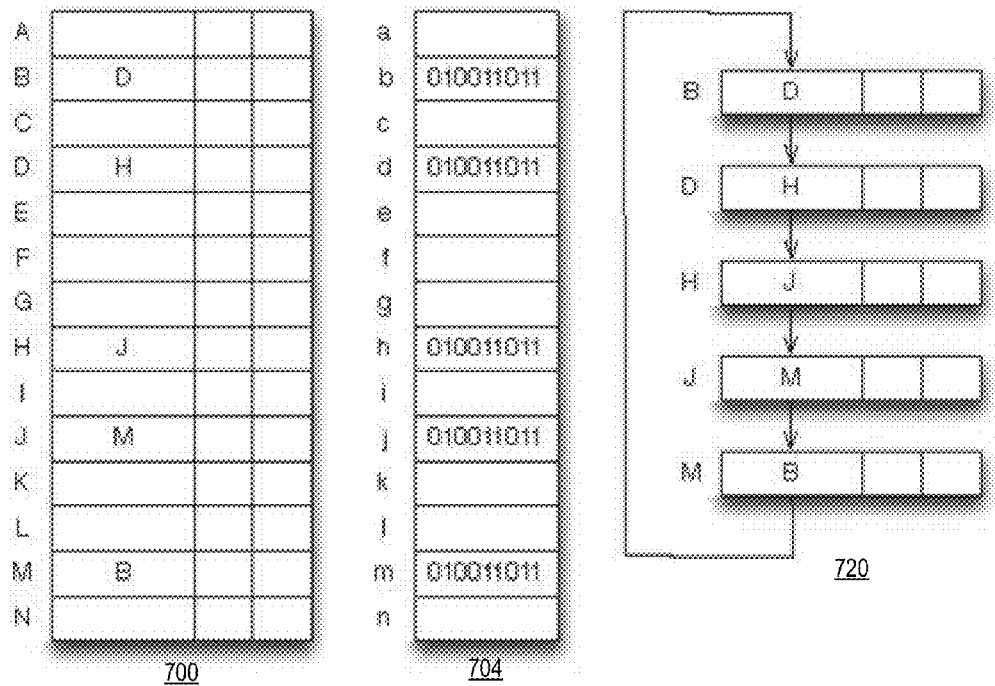
FIG. 7 illustrates another de-dupe index table, physical bit structure and a circular list in the instance where there no limitation on free space.

FIG. 7 illustrates another de-dupe index table 700, physical bit structure 704 and a circular list 720 in the instance where there no limitation on free space. As shown, physical location b, d, h and m have the same data. Because there is a one-to-one mapping of the indices in the table 700 with the physical locations in the structure 702, the circular list 720 is created with B pointing to D; D pointing to H; H pointing to J; J pointing to M; and M pointing back to B.

Over time, more data is written to the system, but however snapshots are also deleted in the ordinary course of scheduled operation. As such, the provisions occupied with snapshots become available for reuse as they are released, creating more free space. Typically, a system administrator will allocate enough storage space at the outset such that a storage crunch will not occur based on usage projections. In other situations, storage may be added before the storage crunch occurs.

Figure 8:
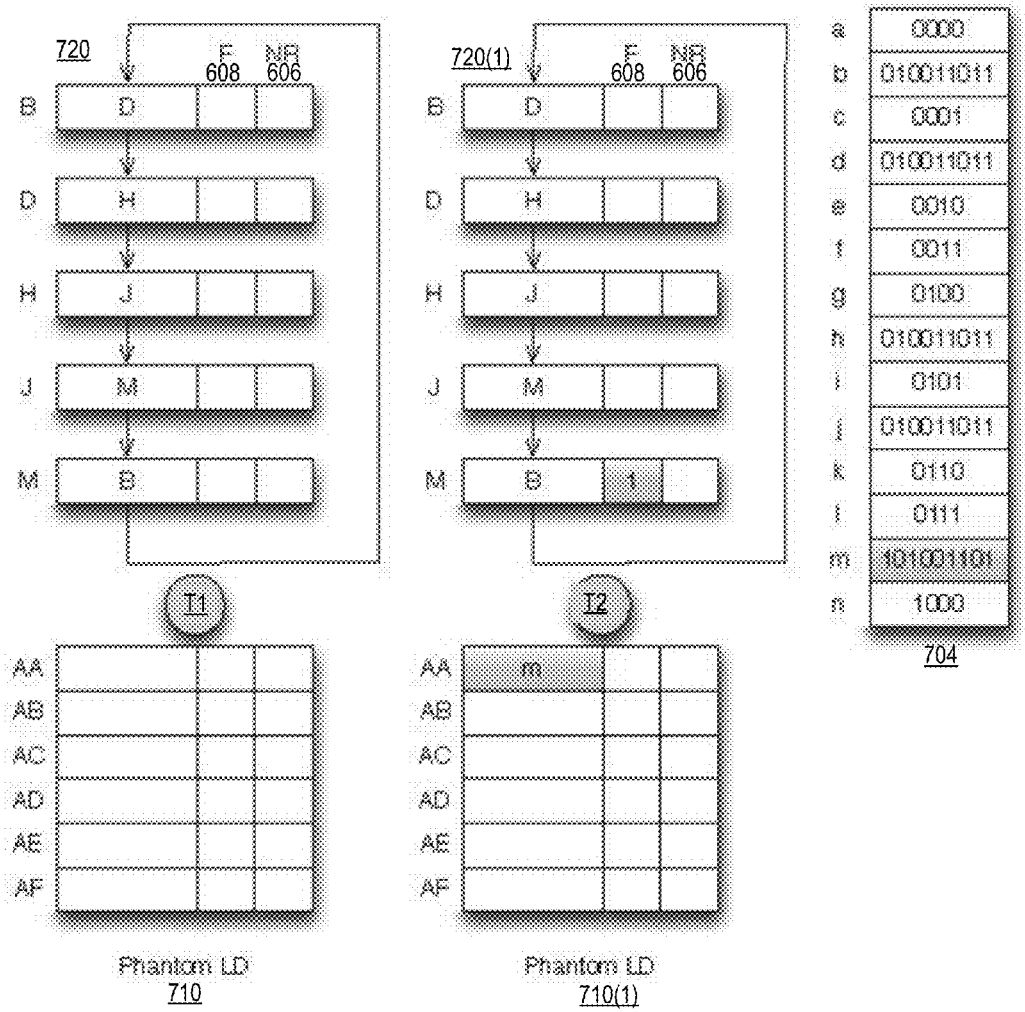
FIG. 8 illustrates the processes performed when a space crunch occurs using the structures of FIG. 7.

FIG. 8 illustrates the processes performed when a space crunch occurs. Whenever a space crunch occurs, the de-dupe kernel module 512 will scan through the system and pick-up unwritten chunks in allocated provisions, which can be reused for a phantom LD table 710. The phantom LD table 710 is empty until the space crunch. In some implementations, the table 710 may not be provided at all until necessary. Thus, phantom LD table 710 is dynamically allocated and not used until needed. The de-dupe kernel module 512 may maintain a list of free circular lists. For example, very long circular lists, i.e. those with 50 entries or more, the de-dupe kernel module 512 consider these to be good candidates from which to take free space in order to provide more system resources.

The allocation logic of the phantom LD may be as follows. The system 100 may take one node and keep it as a head to the circular list. When the system needs space, the system can take one entry from the list, go to the circular list and set the foreign bit to represent that the original physical location is been taken. In some implementations, if there is greater than 50-90% of space available, not counting duplicates, then the phantom LD table 710 is not necessary. By avoiding generating the linked lists (LD table) until necessary it saves on both memory and I/O processing time. This provides performance of and un-de-dupe system. The phantom LD table 710 can be generated on-the-fly by examining any physical location on the de-dupe index table 700 (FIG. 7), and look for a relatively long circular lists that would be good candidates. This may be performed by a background task. This may provide access to thousands of chunks because the system is looking for larger circular lists. The phantom LD table 710(1) may be created by adding an initial, e.g., 100 entries.

FIG. 8 further illustrates the use of the foreign bit 608. Assuming now that the entire storage stack is utilized, then physical locations a-n in the structure 704 all have data. As shown, m is the last data item in the circular list, and it contains a duplicate of what is in physical location d. As shown, there is a space crunch and the duplicates have already been identified. To accommodate this situation, a phantom LD table 710 can be created. At T1, the circular list is present, as shown in the structure 704 of FIG. 8. At T2, when a write I/O comes in, the DVM 510 will request more space, however there is no more space available. Thus, in accordance with implementations of the present disclosure, the phantom LD table 710(1) may be used to create space by directing the write to the phantom location AA. However, the physical location where the data is stored is taken from the circular list in the structure 704, i.e. physical location for this write will be m. When the write associated with AA is made to m, the foreign bit associated with index M is set. The location AA is set to m as the new data is written to m.

The foreign bit represents that the data in the physical location m is not that associated with the index M and that the data must be found elsewhere. As such, when the next read at the index M is performed, the present disclosure takes advantage of the fact that duplicates of M are written to B, D, H and J. Thus, to obtain the data associated with index m, the present disclosure will walk the circular list in the structure 704 to the next entry (i.e., B) to obtain the data associate with index location M. If, however, the foreign bit associated with the index B is set, then the present disclosure will move onto the next entry D to obtain the data, and so on.

After this, READs for the chunk in the LST cannot be served from its in-place location, as its foreign bit is set. So, the algorithm traverses the circular list till it finds a chunk whose foreign bit is not set. This chunk's in-place data is then read and the READ is satisfied. It is important to note that in a chain it is possible that all chunks in-place locations could be leased out to the right side table. However, this would render further reads to any of the chunk in the chain to fail. Hence, this would not be allowed. Always, a minimum number of golden chunks (say 2 or 3) would be maintained in the chunk whose data cannot be leased out.

Now, if a WRITE is received for the chunk in a circle whose in-place location has been leased out, then the algorithm will first look for a peer chunk in the circle whose in-place location has not been leased out. If there are a minimal number of golden chunks in the chain is reached or when the write is a full chunk write, then preferentially, a free chunk outside the chain is chosen and written. Otherwise the peer chunk's in-place location is used for this write.

If the peer chunk's in-place location is chose, then the original chunk would be taken out of the chain, its non-resident bit would be set, and the peer chunk's foreign bit would be set and the write would simply be done on the physical disk, irrespective of whether this is a full chunk write or not. This is because the original chunk's older data and the peer chunk's older data are the same and there is no need for a read-modify-write.

However, if a free chunk is chosen from outside this chain and the I/O is not a full chunk write, then the peer chunk's data has to be read, the data buffer appropriately modified and then the entire 64 KB data should be written on to this free chunk. Again, in this case, the original chunk must be taken out of its chain, its non-resident bit set and the free chunk's foreign bit must be set.

Thus, a foreign bit would indicate that some other chunk from either the left side or the right side table is using this chunk's space. Whereas, a non-resident bit would indicate that this chunk is using the space provided by some other chunk. Since, it is possible for a chunk to use some other chunk's in-place location without it being part of a de-dupe chain, it is possible for it to have a re-write even though it does not have a one-to-one mapping from left side address to right side address. Because of this fact, it may not be always possible to reuse the chunk number with −1 to indicate re-writes.

Figure 9A:
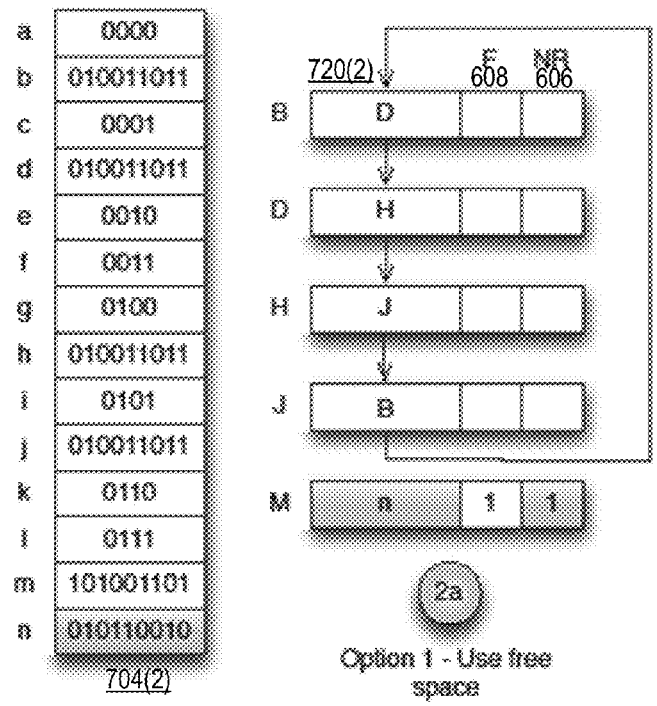
FIGS. 9A-9B illustrate processes performed when a new write is received while there is a space crunch.
Figure 9B:
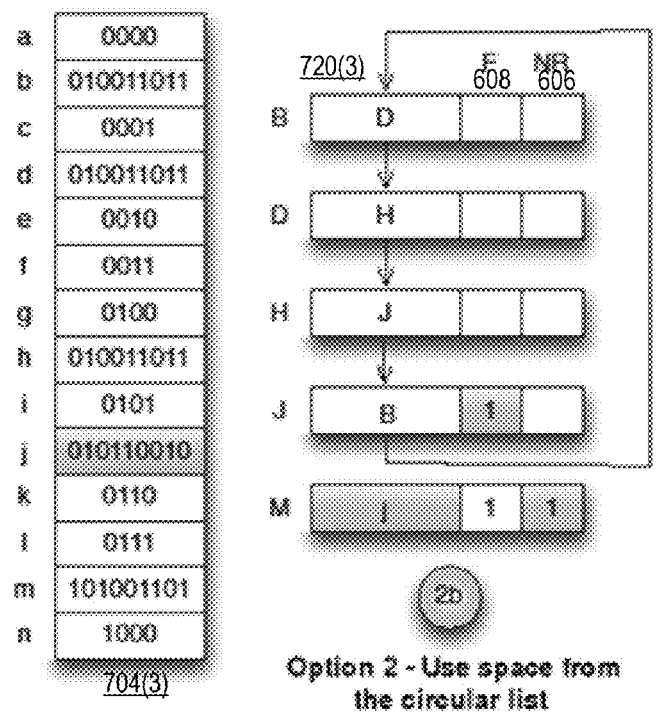

FIGS. 9A and 9B illustrate a situation where a new write comes to M where m is taken by data for another location (i.e., AA; 719(1) in FIG. 8). In accordance with the some implementations, when the write comes into M there may be free space available because, e.g., a snapshot has been deleted from the system 100. Thus, even though there was a space crunch, the system 100 may be able to reclaim space because of the deletion of snap shot. As shown in FIG. 9A, initially a-m have data, however n is empty. In this situation, the physical space associated with n may be used for new data associated with the M address mapping. In this situation, the M address spacing is marked as n and the nonresident bit 606 is set. By setting the nonresident bit 606, this represents that the address mapping M cannot be directed to m, but rather is directed to n. Here, if the write is equal to the chunk size, it can be directly written to the new location. But, it is less than 64 k, then the system needs to keep the original data. The system will walk through the list again and identify chunk which does not have the foreign bit set and read from there to get the original duplicate data. Then, the new write is tagged on top of the original data and written into the address location n.

In accordance with some implementations, there may not be free space, but however free space may have been advertised using the circular list (i.e., there is de-duped free space but not actual free space). In FIG. 9B, j holds the duplicate data in the circular list. Thus, the system can walk through the circular list and determined that there is more than one duplicate available and can allocate space in the circular list. For example, with regard to J, the system will walk the chain, allocate the space, and mark the foreign bit for that location. Thus, the index location J will map to B and the physical data associated with M is j. If the I/O is less than 64 k, option one requires Read-Modify. Here, that is not necessary because the duplicate already has the same data as original M and the system can write to the physical address j and mark the foreign bit and non-resident bit. In FIG. 9B, the in-memory updates are minimal and the areas requiring locking are also minimal. In addition, the amount of data that needs to be persisted to disk is also minimal.

Thus, the above de-duplication mechanism may be used in, for example, mail servers where there is a fair amount of duplication as the same e-mail is often sent to multiple recipients. Thus, mail servers are good candidates for de-duplication. In addition, e-mails are often archived and placed onto backup systems. Also, on mail servers typically the data is only read, as e-mails are generally not modified.

Figure 10A:
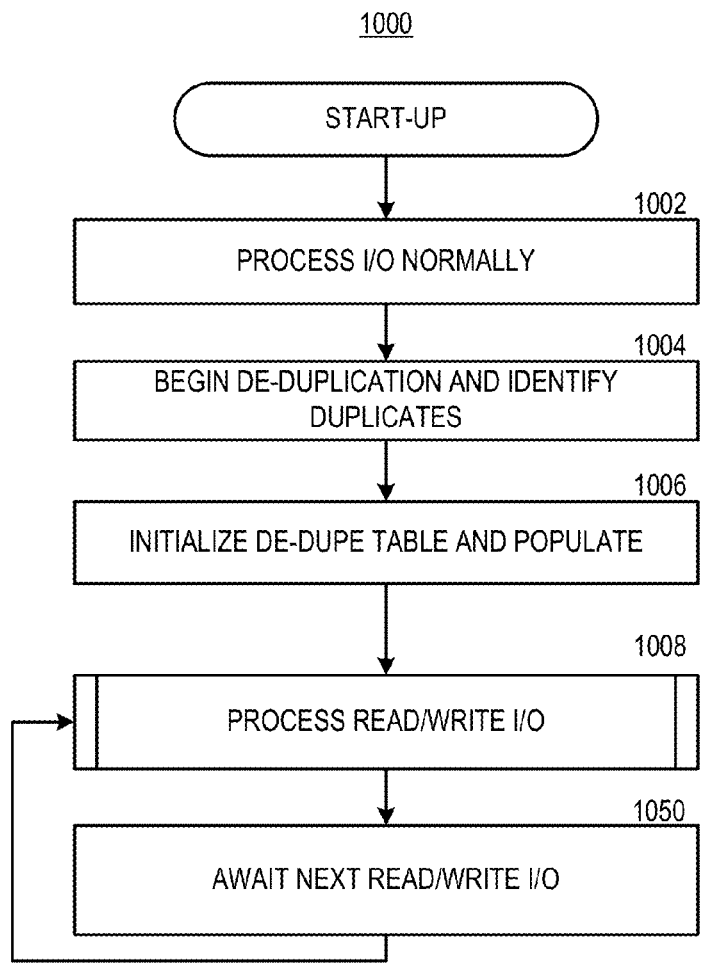
FIGS. 10A-10B illustrate an operational flow diagram of system operation and I/O processing.
Figure 10B:
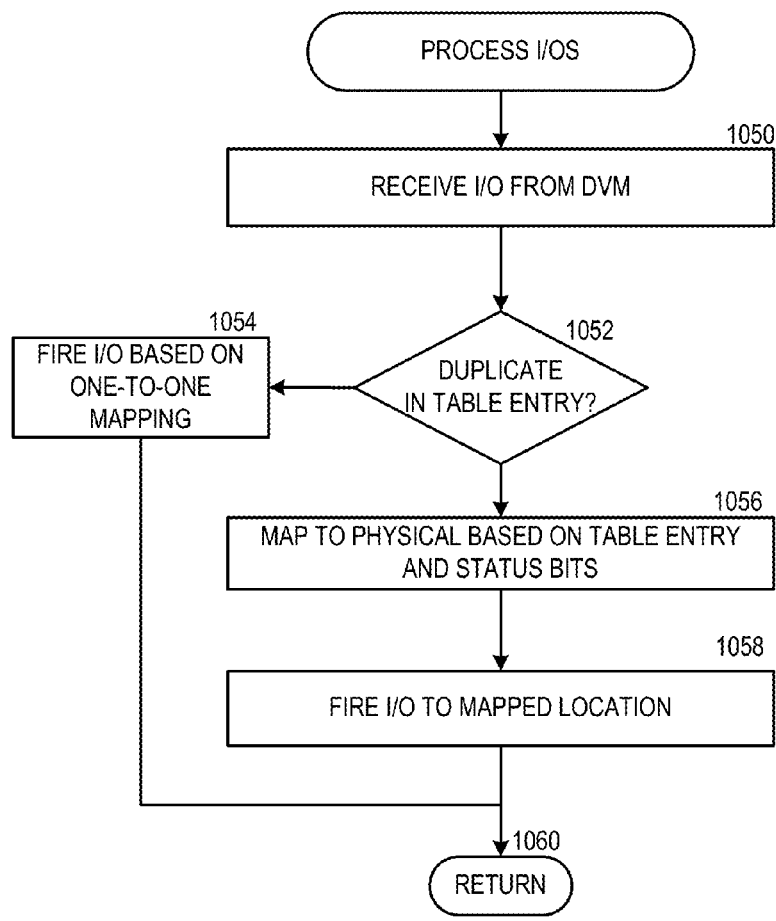

FIGS. 10A-10B illustrate an operational flow diagram 1000 of system operation and I/O processing in accordance with the above. Initially, the system is startup, with no duplicates identified. At 1002, I/Os are processed normally in a one-to-one relationship between LDs to physical zones. The I/Os are processed in this manner because no duplicates have been identified. In addition, because there is no need for tables 514, they are not created at this point. Thus, memory is conserved and I/O processing is not degraded by the extra de-duplication processing.

At 1004, de-duplication commences. De-duplication may begin based on several criteria, including a periodic schedule, free space requirements, etc. The de-dupe finder 506 may make a request for chunks to de-dupe. When run, the de-dupe finder 506 will chunks that have been modified since a last de-duplication. At 1006, the de-dupe index table is initialized. The de-dupe finder 506 may initialize and create the de-dupe index table 700. The table is populated with duplicates that are identified by the circular list, as described above. The duplicated data may not be physically removed at this time.

At 1008, a subsequent I/O is received after a de-duplication process has run. Referring now to FIG. 10B, the I/O comes from the DVM 510 (1050) and the LD associated with the I/O is matched with the physical LD at the RAID layer with the logical LD. The RAID level will identify the physical disk that it needs to read from based the logical LD and return the read request. When an I/O lands, it is determined which 64 kB it lands, then the processing is performed at 1052 to determine if the I/O is associated with an LD that is a duplicate indexed in the de-dupe index table 700. The process may consult the rewrite bit to see if the data is a duplicate. If the LD is not associated with a duplicate, then at 1054 the one-to-one mapping is used to fire the I/O. If the LD is associated with a duplicate, then the circular list is used. The I/O can be processed from any of the locations in the circular list. For example, if the I/O is writing to an LD of having an index B in the de-dupe index table 800, the I/O will be fired to the physical chunk d, and so on. Depending on the status bits, in accordance with the description of FIGS. 8, 9A and 9B, the process may access the phantom logical disk (LD) table 810 to determine a mapping. Processing then returns to 1010 to await a next I/O (FIG. 10A).

Figure 11:
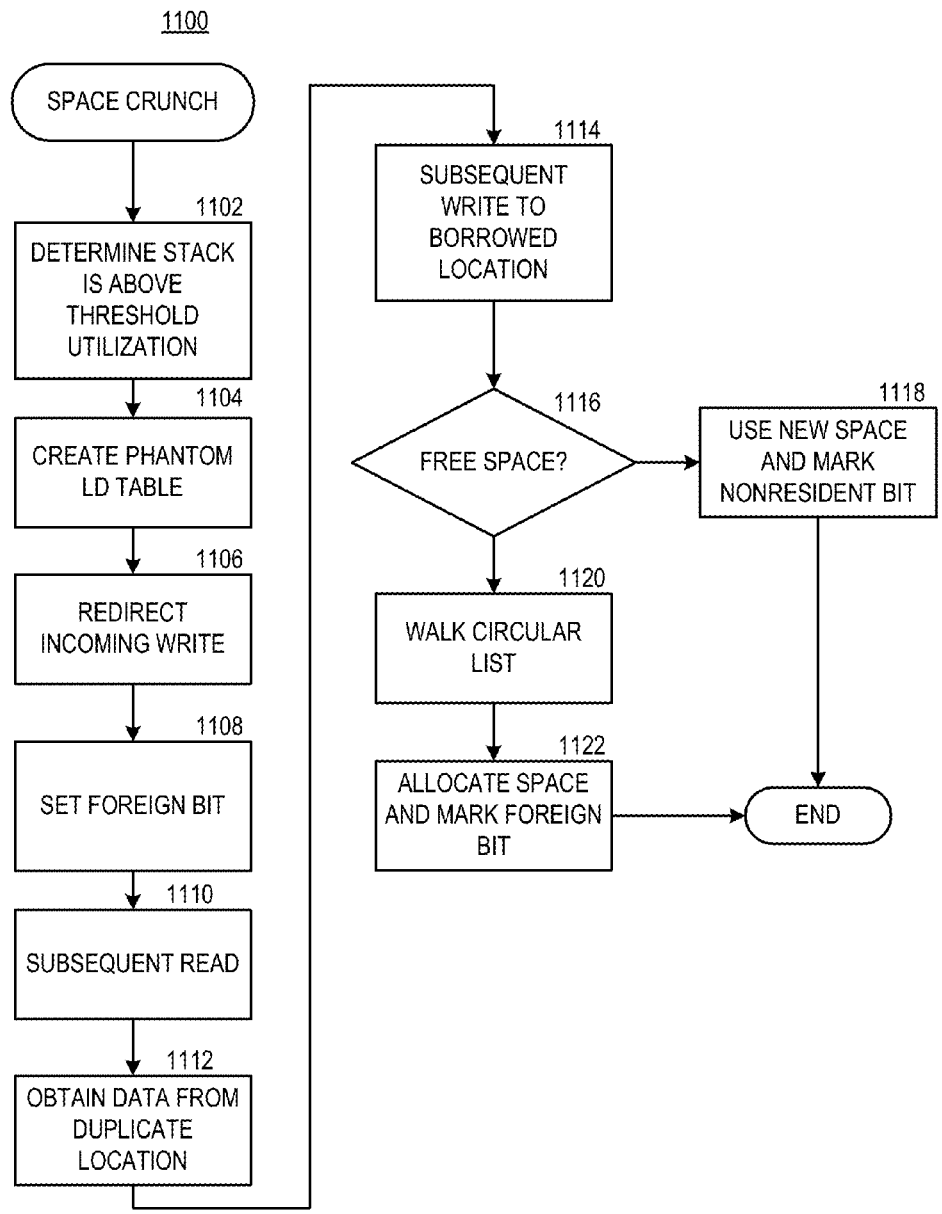
FIG. 11 illustrates an example operational flow diagram of processes performed when a space crunch is determined in the system.

FIG. 11 illustrates an example operational flow diagram 1100 of processes performed when a space crunch is determined in the system. At 1102, it is determined that the entire storage stack is utilized. For example the physical locations a-n in the structure 704 all have data. Alternatively, the utilization may have crossed an upper threshold. At 1104, a phantom LD table is created. The phantom LD table 710(1) may be created on-the-fly when as space crunch is determined.

At 1106, an incoming write is redirected to the phantom LD table. Using an existing circular list within the de-dupe index table 800, when the write I/O comes in, the phantom LD table 710(1) may be used to create space by directing the write to a phantom location, e.g., AA. However, the physical location where the data is stored is taken from the circular list in the structure 704, i.e. physical location for this write will be m. At 1108, the foreign bit associated with the index to which the write is directed is set. For example, when the write associated with AA is made to m, the foreign bit associated with index M is set. The location AA is set to m as the new data is written to m.

At 1110, at a subsequent point in time, a read directed to the index location is received. When the next read at the index M is performed, the duplicates of M are present B, D, H and J. Thus, to obtain the data associated with index m, at 1112, the logic will walk the circular list in the structure 704 to the next entry (i.e., B) to obtain the data associate with index location M. If, however, the foreign bit associated with the index B is set, then the present disclosure will move onto the next entry D to obtain the data, and so on.

At 1114, a new write comes to the location where data is taken by data for another location. For example, the write may come to the location M where m is taken by data for another location (i.e., AA; 719(1) in FIG. 8). If there is free space at 1116, then, at 1118, a physical space may be used for the new data and the nonresident bit is set. For example, data associated with n may be used for new data associated with the M address mapping. In this situation, the M address spacing is marked as n and the nonresident bit 606 is set. If there is not new free space at 1116, then the system will walk through the circular list at 1120 and determined that there is more than one duplicate available and can allocate space in the circular list. Next, at 1122, the system will allocate space and mark the foreign bit for that location. Thus, the index location J will map to M and the physical data associated with M is j. If the I/O is less than 64 kB, option one requires Read-Modify.

Figure 12:
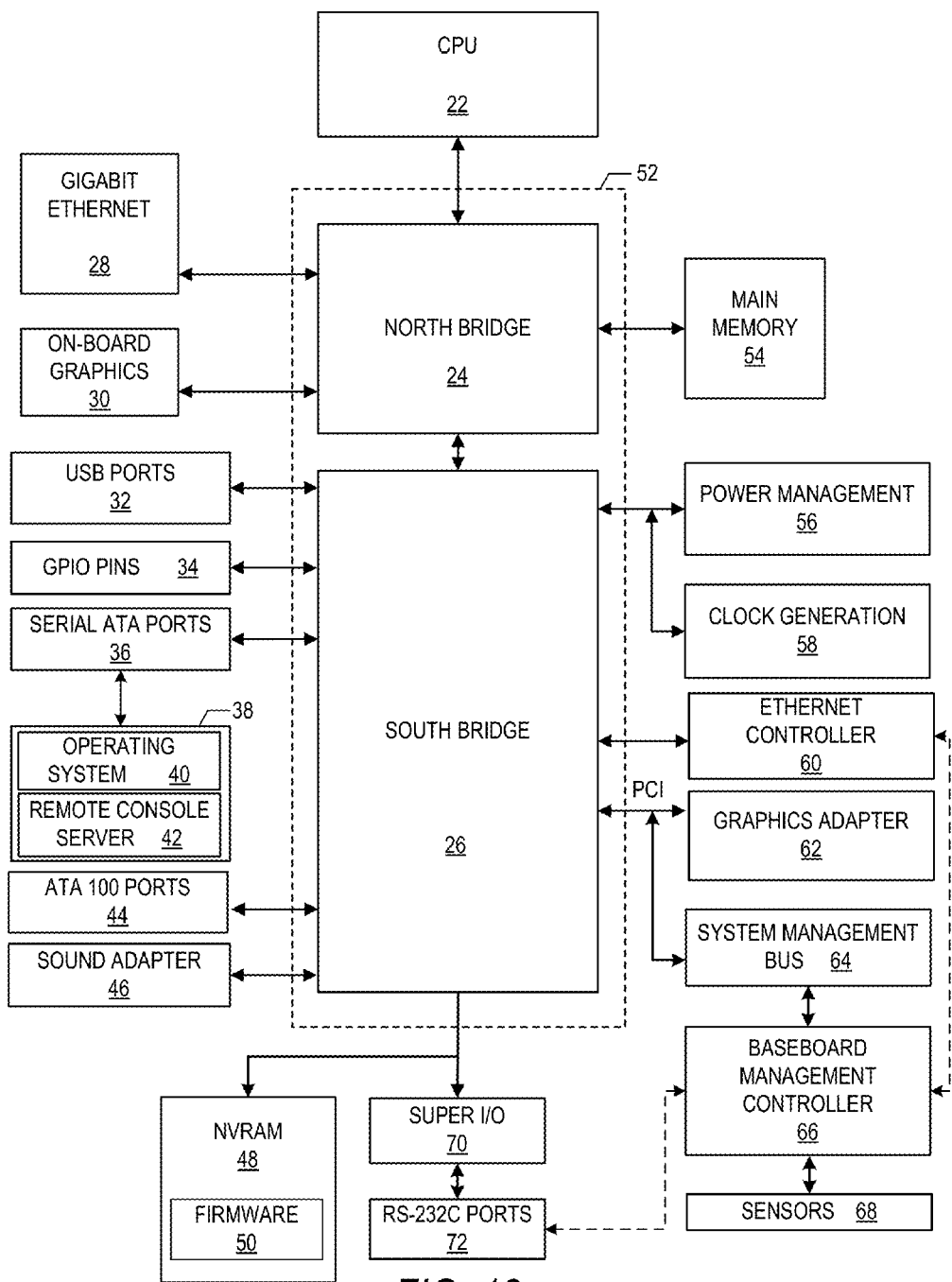
FIG. 12 is a computer architecture diagram illustrating a computer hardware architecture for a computing system capable of eliminating duplicate regions within a data storage system according to an embodiment presented herein.

FIG. 12 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 12 shows an illustrative computer architecture for a storage server computer 2 that may be utilized in the implementations described herein. Such an illustrative computer system may also describe a client computer system 8A-8N. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory (RAM) used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus (USB) ports 32, a sound adapter 46, an Ethernet controller 60, and one or more general purpose input/output (GPIO) pins 34. The south bridge 26 may also provide a bus for interfacing peripheral card devices such as a graphics adapter 62. In one embodiment, the bus comprises a peripheral component interconnect (PCI) bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment (SATA) adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the disclosure, the operating system 40 comprises the LINUX operating system. According to another embodiment of the disclosure the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count (LPC) interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 12, may include other components that are not explicitly shown in FIG. 12, or may utilize an architecture completely different than that shown in FIG. 12.

Based on the foregoing, it should be appreciated that technologies for eliminating duplicated data within a data storage system are presented herein. Although the subject matter presented herein has been described in language specific to computer structural features, methodological acts, and computer readable media, it is to be understood that the disclosure defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A method for removing duplicate data within a data storage system, comprising:
   identifying duplicated data within the data storage system;
   initializing a de-duplication table;
   creating at least one circular list of indices in the de-duplication table, wherein each of the indices points to a physical location having a same data;
   receiving I/O requests; and
   mapping the I/O requests to the physical location using the de-duplication table.

2. The method of claim 1, further comprising avoiding moving any data movement as part of the removing duplicate.

3. The method of claim 1, further comprising initializing the de-duplication table at a point in time when the duplicated data is identified.

4. The method of claim 1, further comprising performing the data de-duplication at a chunk level.

5. The method of claim 1, further comprising:
   walking the at least one circular list to a next entry associated with an index to which a read I/O request is received; and
   retrieving data from the physical location associated with the next entry.

6. The method of claim 5, further comprising:
   accessing a status bit associated with the index to which the read I/O request is received; and
   accessing a phantom LD table if a foreign status bit is set in order to obtain the data.

7. The method of claim 1, further comprising:
   logging updates to the de-duplication table in a log file; and
   persisting the log file to disk.

8. The method of claim 7, further comprising replaying the log file to recreate the de-duplication table in the event of a power-cycle.

9. The method of claim 1, further comprising performing the method as a post-processing operation after I/Os are received.

10. The method of claim 1, further comprising:
    providing the de-duplication table as a group of tables, wherein each group is a size of a memory page; and
    allocating a page in memory a zone within a group is identified as having duplicated data.

11. A data storage system, comprising:
a storage server;
a physical storage device associated with the storage server;
a processing unit associated with the storage server; and
one or more modules for execution on the processing unit, operable to identify duplicated data within the data storage system, initialize a de-duplication table, create at least one circular list of indices in the de-duplication table, wherein each of the indices points to a physical location having a same data, receiving I/O requests, and map the I/O requests to the physical location using the de-duplication table.

12. The data storage system of claim 11, further comprising avoiding moving any data movement as part of the removing duplicate.

13. The data storage system of claim 11, further comprising initializing the de-duplication table at a point in time when the duplicated data is identified.

14. The data storage system of claim 11, further comprising:
walking the at least one circular list to a next entry associated with an index to which a read I/O request is received; and
retrieving data from the physical location associated with the next entry.

15. The data storage system of claim 14, further comprising:
accessing a status bit associated with the index to which the read I/O request is received; and
accessing a phantom LD table if a foreign status bit is set in order to obtain the data.

16. The data storage system of claim 11, further comprising:
logging updates to the de-duplication table in a log file; and
persisting the log file to disk.

17. The data storage system of claim 11, further comprising performing the method as a post-processing operation after I/Os are received.

18. The data storage system of claim 11, further comprising:
providing the de-duplication table as a group of tables, wherein each group is a size of a memory page; and
allocating a page in memory a zone within a group is identified as having duplicated data.

19. A non-transitory computer-readable storage medium having computer-executable instructions stored thereon which, when executed by a computer system, cause the computer system to:
identify duplicated data within the data storage system;
initialize a de-duplication table;
create at least one circular list of indices in the de-duplication table, wherein each of the indices points to a physical location having a same data;
receiving I/O requests; and
map the I/O requests to the physical location using the de-duplication table.

20. The non-transitory computer-readable storage medium of claim 19, further comprising causing the computer system to walk the at least one circular list to a next entry associated with an index to which a read I/O request is received; and retrieve data from the physical location associated with the next entry.

\* \* \* \* \*